United States Patent
Khaless et al.

(10) Patent No.: US 10,689,261 B2
(45) Date of Patent: Jun. 23, 2020

(54) PROCESS FOR PRODUCING SODIUM SULPHATE FROM PHOSPHOGYPSUM

(71) Applicant: OCP SA, Casablanca (MA)

(72) Inventors: Khaoula Khaless, El Jadida (MA); Driss Dhiba, Casablanca (MA)

( * ) Notice: Subject to any disclaimer, the term of this patent is extended or adjusted under 35 U.S.C. 154(b) by 0 days.

(21) Appl. No.: 16/320,285

(22) PCT Filed: Jul. 27, 2017

(86) PCT No.: PCT/MA2017/000016
§ 371 (c)(1),
(2) Date: Jan. 24, 2019

(87) PCT Pub. No.: WO2018/021900
PCT Pub. Date: Feb. 1, 2018

(65) Prior Publication Data
US 2019/0263668 A1    Aug. 29, 2019

(30) Foreign Application Priority Data
Jul. 27, 2016    (FR) ...................... 16 57235

(51) Int. Cl.
*C01D 5/16* (2006.01)
*C01D 5/18* (2006.01)
*C01D 5/00* (2006.01)

(52) U.S. Cl.
CPC ............... *C01D 5/16* (2013.01); *C01D 5/00* (2013.01); *C01D 5/18* (2013.01)

(58) Field of Classification Search
CPC ............... C01D 5/00; C01D 5/06; C01D 5/16
See application file for complete search history.

(56) References Cited

U.S. PATENT DOCUMENTS 3,706,531 A * 12/1972 Cozza et al. ............. C01D 5/00
                                                                423/551
4,966,710 A * 10/1990 Kim ........................ B01J 45/00
                                                                210/665
7,514,051 B2 * 4/2009 Pratt ........................ C01D 5/16
                                                                23/302 T

FOREIGN PATENT DOCUMENTS

CN      102 320 629 A   *  1/2012  ............... C01D 5/16
CN         103232052 A       8/2013
(Continued)

OTHER PUBLICATIONS

Bourgier, Veronique, "Influence des ions monohydrogénophosphates et fluorophosphates sur les propriétés des phosphogypses et la réactivité des phosphoplâtres", PhD Thesis, Ecole supérieure des Mines de Saint-Etienne, France, Jan. 2007, pp. 1-240.
(Continued)

*Primary Examiner* — Timothy C Vanoy
(74) *Attorney, Agent, or Firm* — Lerner, David, Littenberg, Krumholz & Mentlik, LLP

(57) ABSTRACT

The present invention relates to a process for producing sodium sulphate from phosphogypsum, comprising:
a step (101) of lixiviation of phosphogypsum by means of a basic solution so as to obtain a sodium sulphate solution (S) containing metal impurities, said basic solution comprising a chelating agent suitable for forming complexes with at least one part of said metal impurities,
at least one first step (103, 104) of filtration of the sodium sulphate solution by a nanofiltration membrane (NF1, NF2), so as to form a concentrate (C1, C2) containing said complexes and a permeate (P1, P2),
a step (105) of evaporation of the permeate (P1, P2) so as to form anhydrous sodium sulphate.

13 Claims, 1 Drawing Sheet

(56) References Cited

FOREIGN PATENT DOCUMENTS

| | | | | |
|---|---|---|---|---|
| CN | 104 211 099 A | * | 12/2014 | .............. C01F 11/02 |
| CN | 107 902 832 A | * | 4/2018 | .............. C01D 5/00 |
| DE | 3721667 A1 | * | 1/1989 | ........... B01D 9/0018 |
| EP | 0001533 B1 | | 4/1979 | |
| WO | 9716376 A1 | | 5/1997 | |
| WO | 2012129510 A1 | | 9/2012 | |
| WO | WO 2018 197753 A1 | * | 11/2018 | ............. C01B 17/96 |

OTHER PUBLICATIONS

Espinosa Marzal et al., "Crystallization of sodium sulphate salts in limestone", Environ. Geol. vol. 56 (3-4), Jul. 2008, pp. 605-621.
Flatt, Robert, "Salt damage in porous materials: How high supersaturations are generated", Journal of Crystal Growth, vol. 242 Issues 3-4, Jul. 2002, pp. 435-454.
International Search Report issued from the corresponding PCT Application PCT/MA2017/000016 dated Jan. 26, 2018, pp. 1-3.
Preliminary Search Report issued for the priority patent Application FR 1657235 dated Apr. 4, 2017, pp. 1-2.
Y. Ennaciri et al.: "Conversion of phosphogypsum to sodium sulfate and calcium carbonate in aqueous solution", Journal of Mater. Environmental Sciences, vol. 7, Issue 6, Apr. 2016, XP055360967, pp. 1925-1933.

* cited by examiner

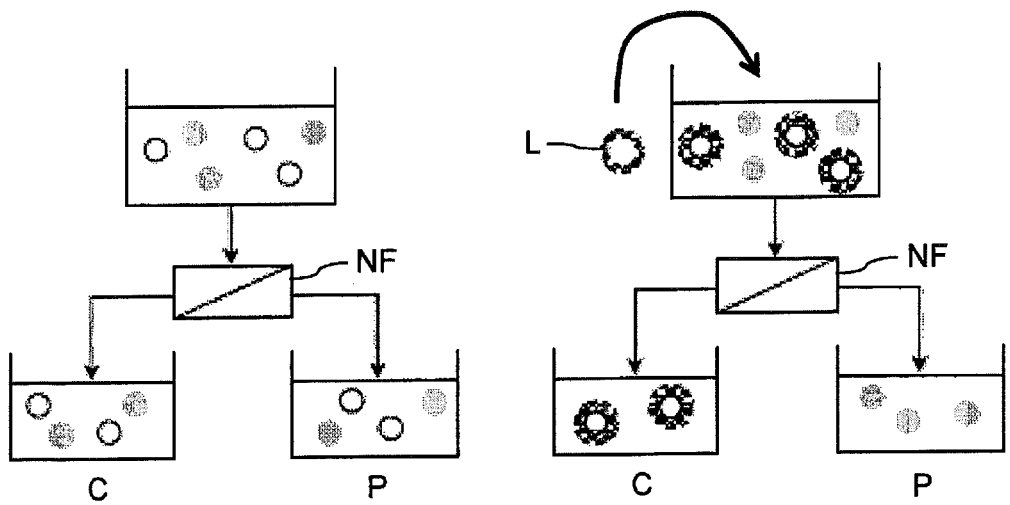
FIGURE 1A   FIGURE 1B
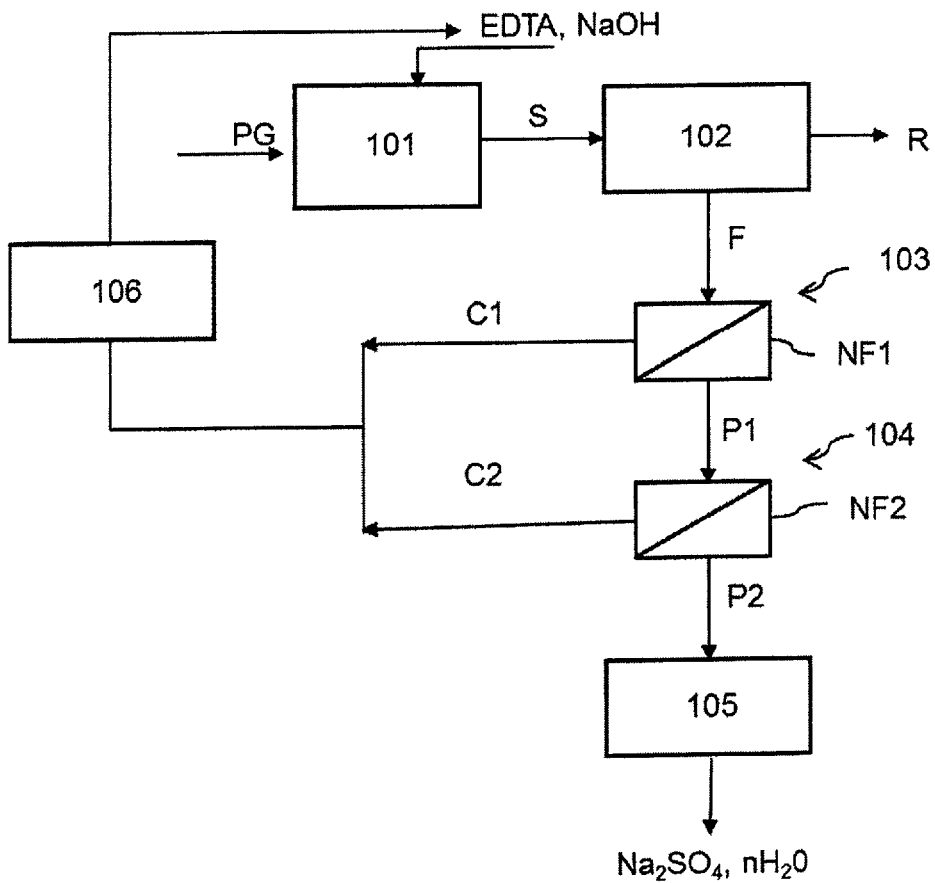
FIGURE 2

PROCESS FOR PRODUCING SODIUM SULPHATE FROM PHOSPHOGYPSUM

CROSS-REFERENCE TO RELATED APPLICATIONS

The present application is a national phase entry under 35 U.S.C. § 371 of International Application No. PCT/MA2017/000016, filed Jul. 27, 2017, which claims priority from French Patent Application No. 1657235, filed Jul. 27, 2016, all of which are incorporated herein by reference.

FIELD OF THE INVENTION

The present invention relates to a process for producing sodium sulphate from phosphogypsum.

BACKGROUND OF THE INVENTION

At the present time, the implementation of a sustainable development strategy makes it possible to increase productivity, cost benefit and profitability by using, for example, by-products derived from other industries.

Thus, within the framework of the preservation of natural resources, it is interesting to replace natural sodium sulphate (also known as Glauber's salt) by synthetic sodium sulphate, especially in countries where the resources are dwindling or are non-existent.

Yet, various industries lead to sodium sulphate as a by-product, which may be a new and inexpensive source of raw material.

Phosphogypsum is the by-product resulting from the production of phosphoric acid by attack of phosphates by sulphuric acid.

Phosphogypsum is generally constituted of sulphates, calcium, different impurities such as $P_2O_5$, F— and organic substances (phosphoric acid, phosphates, fluorites), which adhere to the surface of the crystals of phosphogypsum or may substitute them in the matrix.

The quantity of phosphogypsum produced is very great: the production of one tonne of phosphate is accompanied by the production of five tonnes of phosphogypsum. The annual worldwide production of this material is currently estimated at 250 million tonnes [5].

Processes for producing sodium sulphate from sulphuric acid and sodium hydroxide or sodium chloride are well known. Nevertheless, these processes are costly and complicated. Furthermore, they are hazardous because they resort to toxic products.

It is also known from the document WO 97/16376 [3] to recrystallize sodium sulphate recovered from scale derived from the treatment by sodium bicarbonate of fumes from glass furnaces. However, this process consumes water and leads to the discharge into the natural environment of large quantities of saline water comprising for example chlorides, sulphates, fluorides.

The document EP 0 001 533 [4] describes a process of purification of sodium sulphate, notably sodium sulphate containing traces of methionine. The purification is carried out in oxidising medium by a solution essentially of the group of chlorates and persulphates, then the sodium sulphate thereby treated is calcinated.

BRIEF DESCRIPTION OF THE INVENTION

An aim of the invention is to propose a process for producing sodium sulphate based on phosphogypsum that avoids the aforementioned drawbacks. In particular, an aim of the invention is to conceive a less expensive process than existing processes and which does not generate effluents that are harmful for the environment.

In accordance with the invention, a process for producing sodium sulphate from phosphogypsum is proposed, comprising:
- a step of lixiviation of phosphogypsum by means of a basic solution so as to obtain a sodium sulphate solution containing metal impurities, said basic solution comprising a chelating agent suitable for forming complexes with at least one part of said metal impurities,
- at least one first step of filtration of the sodium sulphate solution by a nanofiltration membrane, so as to form a concentrate containing said complexes and a permeate,
- a step of evaporation of the permeate so as to form anhydrous sodium sulphate.

This process makes it possible to obtain sodium sulphate of high purity (of the order of 95 to 99%).

This process further enables the management and the use of phosphogypsum, which is a by-product from the phosphates industry.

According to other optional characteristics of the production process according to the invention, considered alone or in combination if need be:
- the chelating agent is a hexadentate chelating agent comprising an amine and carboxyl group;
- the chelating agent is selected from ethylene diamine tetraacetic acid (EDTA) and the sodium, potassium, calcium disodium, diammonium, triethanolamine (TEA-EDTA) salts thereof, hydroxyethyl ethylene diamine tetraacetic acid (HEDTA) and the trisodium salt thereof, and mixtures thereof;
- the chelating agent comprises Na+, K+, Ca2+ and/or Cl– ions;
- the chelating agent is present in the basic solution at a concentration of 0.1 to 0.8M, preferably at a concentration of 0.2 to 0.4M;
- the cutoff point of the nanofiltration membrane is comprised between 150 and 1000 $g \cdot mol^{-1}$;
- the process comprises, after the first filtration step, a second step of filtration of the permeate derived from the first step on a nanofiltration membrane and the evaporation step is implemented on the permeate derived from said second filtration step;
- advantageously, at the end of the basic lixiviation step, the solubilisation of the sodium sulphate is comprised between 91 and 99%, preferably between 95 and 98%;
- preferably, the process comprises, before the first filtration step, a step of treatment of the sodium sulphate solution to remove solids therefrom;
- the treatment step comprises a step of centrifugation then filtration of the sodium sulphate solution;
- advantageously, at the end of said treatment, the sodium sulphate solution has a solid content less than 1%, preferably less than or equal to 0.02%;
- the evaporation step is carried out at a temperature comprised between 200° C. and 250° C.;
- preferably, the process comprises a step of recycling of the chelating agent by precipitation of the metal complexes contained in the concentrate obtained at the end of at least one filtration step.

BRIEF DESCRIPTION OF THE DRAWINGS

Other characteristics and advantages of the invention will become clear from the detailed description that follows, with reference to the appended drawings, in which:

FIG. 1 is an outline schematic illustrating the technique of nanofiltration assisted by complexation implemented in the present invention, FIG. 2 is a synoptic of the process for producing sodium sulphate according to one embodiment of the invention.

DETAILED DESCRIPTION OF THE INVENTION

The present invention relates to a process for producing sodium sulphate of high purity (from 95 to 99%) from phosphogypsum.

This process comprises the following main steps.

Firstly, calcium sulphate (which is the main component of phosphogypsum) is converted into sodium sulphate by adding thereto a basic solution (lixiviation step).

Then the sodium sulphate solution is purified by nanofiltration, in order to obtain a permeate which is a solution rich in $Na_2SO_4$ and poor in polyvalent and monovalent metal impurities, in monovalent and polyvalent anionic mineral impurities. This purification step also leads to obtaining a concentrate, which comprises the basic lixiviation solution and the impurities retained by the nanofiltration membrane.

Finally, the permeate is evaporated to obtain the final anhydrous product ($Na_2SO_4$, $nH_2O$; n being comprised between 0 and 10) of high purity (from 95 to 99%).

In a particularly advantageous manner, a large part of the basic solution is recycled by precipitation of the metals contained in the concentrate resulting from the purification step.

The purification is based on a method of nanofiltration assisted by complexation, the principle of which is exposed in FIG. 1B.

As illustrated in FIG. 1A, the filtration of a solution comprising ions of similar molecular weight but of different nature (represented here by white discs and grey discs) by a nanofiltration membrane NF does not make it possible to separate these two types of ions. Consequently, the permeate P (portion of the solution which has passed through the membrane) and the concentrate (portion of the solution which has not passed through the membrane) contain both types of ions.

In the case of nanofiltration assisted by complexation, as illustrated in FIG. 1B, the size of a target ion (for example a metal impurity, here represented by white discs) is increased artificially by complexation with a selective chelating agent (ligand L). Thus, a complex constituted of the ligand and the ion, which has a high molecular weight, is retained by the nanofiltration membrane NF (found in the concentrate C) whereas a single ion—corresponding to the species that it is wished to purify—passes through the membrane NF (found in the permeate P). The nanofiltration membrane is indeed adapted to selectively filter nanometer-scale chemical species, i.e. below 1 nanometer. Separation of the chemical species is carried out by diffusion through the membrane, at a suitable pressure which is quite high compared to a microfiltration process or an ultrafiltration process. The chemical species circulate through the membrane, and those whose size is greater than a predetermined size, said predetermined size being at the nanometer scale and depending on the membrane, are retained by the membrane: in the present case, the complexes constituted by ligands and metallic ions.

FIG. 2 is a synoptic of a preferred embodiment of the invention.

In a first step 101, a solubilisation comprised between 91 and 99%, preferably between 95 and 98%, is carried out of phosphogypsum by means of a basic solution.

Several reagents were used for solubility tests of phosphogypsum such as water, sodium hydroxide, sulphuric acid, sodium carbonate and EDTA (ethylene diamine tetraacetic acid). With sodium carbonate and EDTA, a high solubilisation of phosphogypsum is obtained, of which the solubilisation rate is comprised between 94 and 97%. Conversely, in water and sulphuric acid, it is less than 25%.

As indicated above, the basic lixiviation solution contains a chelating agent suitable for forming a complex with all or part of the metal impurities contained in phosphogypsum.

The chelating agent preferably comprises $Na+$, $K+$, $Ca2+$ and/or $Cl-$ ions.

Preferably, the chelating agent is a hexadentate chelating agent comprising an amine and carboxyl group.

Thus, the chelating agent is advantageously selected from ethylene diamine tetraacetic acid (EDTA) and the sodium, potassium, calcium disodium, diammonium, triethanolamine (TEA-EDTA) salts thereof, hydroxyethyl ethylene diamine tetraacetic acid (HEDTA) and the trisodium salt thereof, and mixtures thereof. In the remainder of the text, EDTA is considered as chelating agent.

The basic aqueous solutions contain sodium $Na^+$ ions coming from: EDTA, NaOH, $NaCO_3$ or equivalent.

The addition of sodium carbonate causes a dissolution of the phosphogypsum and the $Ca++$ ions released exchange with a fraction of the $Na+$ ions and other metal impurities such as Al, Fe, Cd and others.

The solubilisation of the phosphogypsum increases with the pH of the EDTA solution, which is explained by the fact that, for pHs above 8, EDTA is in a basic form (Y4−) which complexes with calcium.

The chelating agent is advantageously present in the basic solution at a concentration of 0.1 to 0.8M, preferably at a concentration of 0.2 to 0.4M.

The pH of the basic solution may be adjusted by addition of sodium hydroxide (NaOH).

At the end of the step of lixiviation of the phosphogypsum, a sodium sulphate solution S is thus obtained containing complexes formed between the chelating agent and the metal impurities initially present in the phosphogypsum.

According to one embodiment of the process, this solution is subjected to a treatment step 102 comprising a centrifugation of the solution then a filtration through a filter press in order to remove the solid residues R. At the end of this treatment, the sodium sulphate filtrate F has a solid content less than 1%, preferably less than or equal to 0.02%.

A first step 103 of filtration through a nanofiltration membrane NF1 is implemented on the filtrate F resulting from the treatment step 102. In the case where this step has been omitted, step 103 is implemented on the solution resulting from the lixiviation-complexation step 101.

During this step, the sodium sulphate solution is made to flow on a membrane NF1, preferably tangentially to said membrane.

The membrane has a cutoff point adapted as a function of the degree of purity that it is wished to reach.

Preferably, the cutoff point is 150 $g \cdot mol^{-1}$, 300 $g \cdot mol^{-1}$, or 1000 $g \cdot mol^{-1}$ or any value comprised between 150 and 1000 $g \cdot mol^{-1}$.

Among suitable membranes may be cited, in a non-limiting manner, organic membranes made of polyethersulphone, polyamide/polysulphone or others, negatively charged in basic medium, in particular the membranes sold under the tradenames MP™, NF™, Desal™, or PES™ respectively by the companies Koch, Filmtec, Osmonics and Nadir.

The separation by means of a membrane is mainly governed by steric effect. Since the ionic force of the solution is considerable, the membrane loses its retention properties, which makes it possible to benefit from the steric effect of the ligands.

Starting with a volume V0 of untreated sodium sulphate solution, a first permeate P1 of purified sodium sulphate is collected, of which the volume is a fraction y1 V0 of the initial volume V0.

The coefficient y1 is advantageously comprised between 0.6 and 0.8.

At the end of step 103, the following are obtained:
a concentrate C1 containing the basic solution and the complexes between the chelating agent and metal impurities such as iron, cadmium and calcium that have been retained by the nanofiltration membrane, and
a permeate P1 which is a sodium sulphate solution containing less metal impurities than the solution derived from the lixiviation step 101.

Indeed, tests on the nanofiltration membrane show that the nanofiltration of $SO_4$ with a low reduction (less than 17%) makes it possible to retain by a steric effect mechanism (size effect) up to 99% in overall value of impurities such as Cd, Ca, Fe, etc. with which the chelating agent has formed a complex.

Nanofiltration is thus a means of purification of the phosphogypsum solution at ambient temperature.

In an advantageous but optional manner, the permeate P1 is subjected to a second filtration step 104 on a nanofiltration membrane NF2.

During this step 104, said first permeate P1 is made to flow on a membrane NF2, preferably tangentially to said membrane.

The membrane NF2 employed in step 104 may be the same as the membrane NF1 employed in step 103 or instead be a different membrane but having a similar chemical structure.

A second permeate P2 of purified sodium sulphate is thus collected, of which the volume is a fraction y2 V0 of the initial volume V0.

The coefficient V0 is typically comprised between 0.4 and 0.8.

The second permeate P2 is characterised by a metal impurities content less than that of the first permeate P1.

The permeates obtained at the end of step 103 and, if need be, step 104, are colourless and were characterised by ICP (inductively coupled plasma spectrometry).

After these treatments of solubilisation and purification by nanofiltration, the final product (anhydrous sodium sulphate) is obtained by concentration and drying at step 105 of the permeate obtained at the end of the final nanofiltration step.

The concentration takes place by evaporation and the drying takes place on a hot surface. The drying in an oven is carried out at a temperature regulated in such a way that the drying is as quick as possible, while preserving the quality of the crystallised compound. It is advisable to avoid it melting: it is thus necessary to operate at several tens of degrees below the melting temperature thereof.

At the end of this drying, a solid ($Na_2SO, nH_2O$, where n is comprised between 1 and 10) of white colour is obtained. Its purity was identified according to the Indian Standard [3].

The sodium sulphate system is complex, because in different temperature and humidity conditions, two phases form (thenardite $Na_2SO_4$ and mirabilite $Na_2SO, 10H_2O$) or a metastable phase (heptahydrate, $Na_2SO_4$, 7 $H_2O$). The metastable phase is formed during the rehydration of anhydrous sodium sulphate ($Na_2SO_4$) at the nucleation of Glauber's salt [1, 2].

An advantage of this process is to produce different grades of sodium sulphate in aqueous solution. They may be treated by bipolar membrane electrodialysis (BMED or equivalent) or membrane electrolysis (ME, electro-electrodialysis or equivalent) to regenerate sulphuric acid and sodium hydroxide. These different grades may be used in different ways.

In a particularly advantageous manner, the process further comprises a step 106 of recycling of the chelating agent.

To this end, the concentrates C1, C2 derived from the steps of purification by nanofiltration are recovered and treated in such a way as to regenerate the chelating agent while eliminating the metal complexes.

When the chelating agent is EDTA, the recycling of EDTA is carried out according to the following steps:
Protonation of the Me-EDTA solution by sulphuric acid to form $EDTA+Me^{2+}$;
Formation of the Fe-EDTA compound by addition of ferric ions;
Precipitation of the metals by addition of sodium hydroxide NaOH to form $Fe(OH)_3$ and $Me(OH)_2$;
Separation and recovery of the solution of $Na_2$-EDTA.

The chelating agent thereby regenerated may then be re-used in the lixiviation step of the process for producing sodium sulphate.

This recycling makes it possible to increase the cost benefit of the process since it substantially reduces the cost of the chelating agent.

Finally, the process has the advantage of not generating secondary effluents (with the exception of equipment cleaning solutions). It thus does not present a risk for the environment.

EXAMPLE 1

Production of Sodium Sulphate without Nanofiltration

In this example, the production of sodium sulphate was carried out according to the following three steps:
solubilisation of phosphogypsum in EDTA solution (pH=10), under stirring for 15 min at ambient temperature, and adjustment of the pH by adding NaOH to the solution;
filtration by centrifugation for 10 min under a speed of rotation of 3000 rpm;
evaporation of the filtrate at a temperature comprised between 200° C. and 250° C.

The product obtained is in the form of a white powder. This powder is not a pure product; it contains in fact a certain proportion of the other compounds of the initial mixture.

The results of physical analysis by XRD show that the final product contains a mixture of two phases ($Na_2SO_4$ and $Na(SO_4)(H_2O)_2$). The final product is thus impure.

TABLE 1

Composition of phosphogypsum (PG) and PG solubilised by EDTA

| Element | PG | Elements | PG solubilised |
|---|---|---|---|
| % $Na_2O$ | 0.12-10 | | |
| % $SO_3$ | 40-47 | | |
| % $FeO_3$ | 0.01-0.25 | pH | 10 |

TABLE 1-continued

Composition of phosphogypsum (PG) and PG solubilised by EDTA

| Element | PG | Elements | PG solubilised |
|---|---|---|---|
| % MgO | 0.01-0.54 | % $SO_4$ | 3.1 |
| % $P_2O_5$ | 0.05-0.1 | % solubilisation rate | 98 |
| % $SiO_2$ | 0.5-6 | % CaO | |
| % CaO | 28-34 | | 33 |
| Cd ppm | 1 | | |
| % Al | 0.05-0.6 | | |

EXAMPLE 2

Process for Producing Sodium Sulphate Including a Single Step of Nanofiltration

In this example, a production process similar to that of example 1 is implemented, but with a single filtration step on a nanofiltration membrane.
solubilisation of phosphogypsum in EDTA solution (pH=10), under stirring for 15 min at ambient temperature, the pH was adjusted by adding NaOH;
filtration by centrifugation for 10 min under a speed of rotation of 3000 rpm. During this step, a filtrate F and a residue R are obtained;
purification of the filtrate F by nanofiltration. During this step, a permeate P1 and a concentrate C1 are obtained;
evaporation of the permeate P1 at a temperature comprised between 200° C. to 250° C.

The results of physical analysis by XRD show that the product obtained after the first nanofiltration step belongs to a single phase ($Na_2SO_4$). Chemical analysis by ICP has shown furthermore that the product contains traces of calcium.

Analyses according to the Indian Standard have shown that the sodium sulphate during this study is grade A (which can be used as detergent).

EXAMPLE 3

Production of Sodium Sulphate Including Two Steps of Nanofiltration

In this example, a purification process similar to that of example 2 is implemented, but with a second step of nanofiltration added.
This process comprises the following steps:
solubilisation of phosphogypsum in EDTA solution (pH=10), under stirring for 15 min at ambient temperature, the pH was adjusted by adding NaOH to the solution;
filtration by centrifugation for 10 min under a speed of rotation of 3000 rpm. During this step, a filtrate F and a residue R are obtained;
filtration of the filtrate F by nanofiltration (membrane NF1). During this step, a permeate P1 and a concentrate C1 are obtained;
filtration of the permeate P1 by nanofiltration (membrane NF2). During this step, a permeate P2 and concentrate C2 are obtained;
evaporation of the permeate P2 at a temperature comprised between 200° C. and 250° C.

Physical analyses by XRD, complexometric titration and chemical analyses according to the Indian Standard have shown that the product obtained after the second nanofiltration step is pure and that in the composition of $Na_2SO_4$, $nH_2O$, n depends on the temperature and the crystallisation time.

TABLE 2

Composition of the product $Na_2SO_4$, $nH_2O$
(n comprised between 6 and 10)

| Element | Atomic weight | Number of atoms | % by weight |
|---|---|---|---|
| Na | 22.98 | 2 | 18.38-14.27 |
| S | 32.06 | 1 | 12.82-9.95 |
| O | 15.99 | 10-14 | 63.96-69.52 |
| H | 1.00 | 12-20 | 9.83-6.25 |

It goes without saying that the examples that have been given are only particular illustrations which are in no way limiting as regards the application fields of the invention.

REFERENCES

[1] Rosa M. Espinosa Marzal, George W. Scherer, Crystallization of sodium sulphate salts in limestone, Environ. Geol. 2008, 56(3-4): 605-621.
[2] Robert J. Flatt, Salt damage in porous materials: How high supersaturations are generated, J. Cryst. Growth 2002, 242(3-4): 435-454.
[3] WO 97/16376
[4] EP 0 001 533
[5] V. Bourgier, *Influence des ions monohydrogénophosphates et fluorophosphates sur les propriétés des phosphogypses et la réactivité des phosphoplâtres*, PhD Thesis, Ecole supérieure des Mines de Saint-Etienne, France, 2007.

The invention claimed is:
1. A process for producing sodium sulphate from phosphogypsum, comprising:
a step of lixiviation of phosphogypsum by means of a basic solution comprising a chelating agent so as to obtain a sodium sulphate solution containing metal impurities, wherein at least one part of said metal impurities form complexes with the chelating agent,
at least one first step of filtration of the sodium sulphate solution by a nanofiltration membrane, so as to form a concentrate containing said complexes and a permeate,
a step of evaporation of the permeate so as to form anhydrous sodium sulphate.
2. The process of claim 1, wherein the chelating agent is a hexadentate chelating agent comprising an amine and carboxyl group.
3. The process of claim 2, wherein said chelating agent is selected from ethylene diamine tetraacetic acid (EDTA) and the sodium, potassium, calcium disodium, diammonium, triethanolamine (TEA-EDTA) salts thereof, hydroxyethyl ethylene diamine tetraacetic acid (HEDTA) and the trisodium salt thereof, and mixtures thereof.
4. The process of claim 1, wherein the chelating agent comprises Na+, K+, Ca2+ and/or Cl− ions.
5. The process of claim 1, wherein the chelating agent is present in the basic solution at a concentration of 0.1 to 0.8M.
6. The process of claim 1, wherein the cutoff point of the nanofiltration membrane is comprised between 150 and 1000 g·mol$^{-1}$.
7. The process of claim 1, comprising, after the first filtration step, a second step of filtration of the permeate derived from the first step on a nanofiltration membrane, and wherein the evaporation step is implemented on the permeate derived from said second filtration step.

8. The process of claim 1, wherein at the end of the basic lixiviation step, the solubilisation of the sodium sulphate is comprised between 91 and 99%.

9. The process of claim 1, comprising, before the first filtration step, a step of treatment of the sodium sulphate solution to remove solids therefrom.

10. The process of claim 9, wherein said treatment step comprises a step of centrifugation then filtration of the sodium sulphate solution.

11. The process of claim 9, characterised in that at the end of said treatment, the sodium sulphate solution has a solid content less than 1%.

12. The process of claim 1, wherein the step of evaporation is carried out at a temperature comprised between 200° C. and 250° C.

13. The process of claim 1, comprising a step of recycling of the chelating agent by precipitation of the metal complexes contained in the concentrate obtained at the end of at least one filtration step.

* * * * *